(12) United States Patent
Spanninger

(10) Patent No.: US 8,517,204 B1
(45) Date of Patent: Aug. 27, 2013

(54) DRIP PAN DEVICE FOR COLLECTING LEAKS FROM WATER HEATER

(76) Inventor: Stephan J. Spanninger, Port Charlotte, FL (US)

( * ) Notice: Subject to any disclaimer, the term of this patent is extended or adjusted under 35 U.S.C. 154(b) by 29 days.

(21) Appl. No.: 13/077,402

(22) Filed: Mar. 31, 2011

(51) Int. Cl.
*B65D 1/34* (2006.01)

(52) U.S. Cl.
USPC ............................................. 220/571

(58) Field of Classification Search
USPC ............... 220/571, 571.1, 475; 15/257.1, 15/257.7, 257.8; 280/47.27; 37/265; 294/1.4, 294/31.2, 32
See application file for complete search history.

(56) References Cited

U.S. PATENT DOCUMENTS

| | | | |
|---|---|---|---|
| 312,016 A | 2/1885 | Price et al. | |
| 2,648,959 A * | 8/1953 | Budzyna | 15/257.7 |
| 2,782,615 A * | 2/1957 | Johnson | 15/257.1 |
| 2,921,798 A | 1/1960 | Cislak | |
| D246,774 S | 12/1977 | Esposito | |
| 5,143,389 A | 9/1992 | Jonkers | |
| 5,299,826 A | 4/1994 | Flowers | |
| 6,874,799 B2 | 4/2005 | Robberson et al. | |
| 7,195,257 B2 | 3/2007 | Stoneback et al. | |
| 7,431,314 B2 | 10/2008 | Donaldson | |
| D643,985 S * | 8/2011 | Dedrick | D32/74 |
| 2007/0114739 A1 | 5/2007 | Simmons | |

* cited by examiner

*Primary Examiner* — Harry Grosso

(57) ABSTRACT

A drip pan device featuring a semi-circular a base platform having a front edge and a curved back edge, wherein the front edge is bevelled. A lip extends upwardly and generally perpendicularly from the back edge of the base platform. The lip tapers down at intersections of the back edge and front edge of the base platform. A plurality of raised ribs extends upwardly from the top surface of the base platform. A first buckle and a second buckle are disposed on a back surface of the lip. The buckles allow hook-and-loop fasteners, bungee cords, string, or rope, to secure the drip pan device to a hand truck.

3 Claims, 3 Drawing Sheets

DRIP PAN DEVICE FOR COLLECTING LEAKS FROM WATER HEATER

FIELD OF THE INVENTION

The present invention is directed to a drip pan, more particularly to a drip pan device adapted to collect leaks from water heaters when the water heaters are removed from the interior of a living space.

BACKGROUND OF THE INVENTION

Removing leaky water heaters can be a messy project. Typically floors must be covered heavily with plastic or other waterproof materials. The present invention features a novel drip pan device for helping to collect leaks when removing a water heater. The device of the present invention can help save time and money by reducing the amount of labor and materials required to cover floors when a heater is in the interior of a living space (e.g., home, condominium, etc.)

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a drip pan device comprising a base platform having a front edge and a curved back edge, the front edge is beveled; a lip extending upwardly and generally perpendicularly from the back edge of the base platform, the lip tapers down at intersections of the back edge and front edge of the base platform; a plurality of raised ribs disposed and extending upwardly from a top surface of the base platform; and a first buckle and a second buckle disposed on a back surface of the lip, the buckles allow hook-and-loop fasteners, bungee cords, string, or rope, to secure the drip pan device to a hand truck.

In some embodiments, the base platform is generally semi-circular in shape. In some embodiments, the first buckle and the second buckle are both removably attached to the back surface of the lip. In some embodiments, the first buckle engages a set of first holes disposed in the lip and the second buckle engages a set of second holes disposed in the lip.

DESCRIPTION OF PREFERRED EMBODIMENTS

Figure 4:
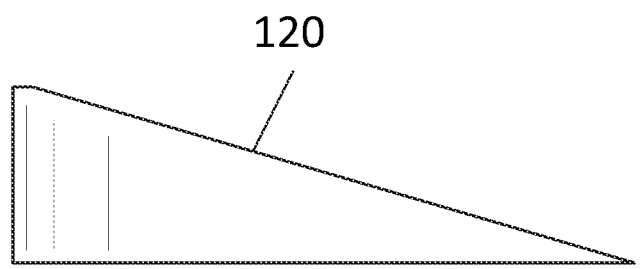
FIG. 4 is a side view of the drip pan device of FIG. 1.
Figure 5:
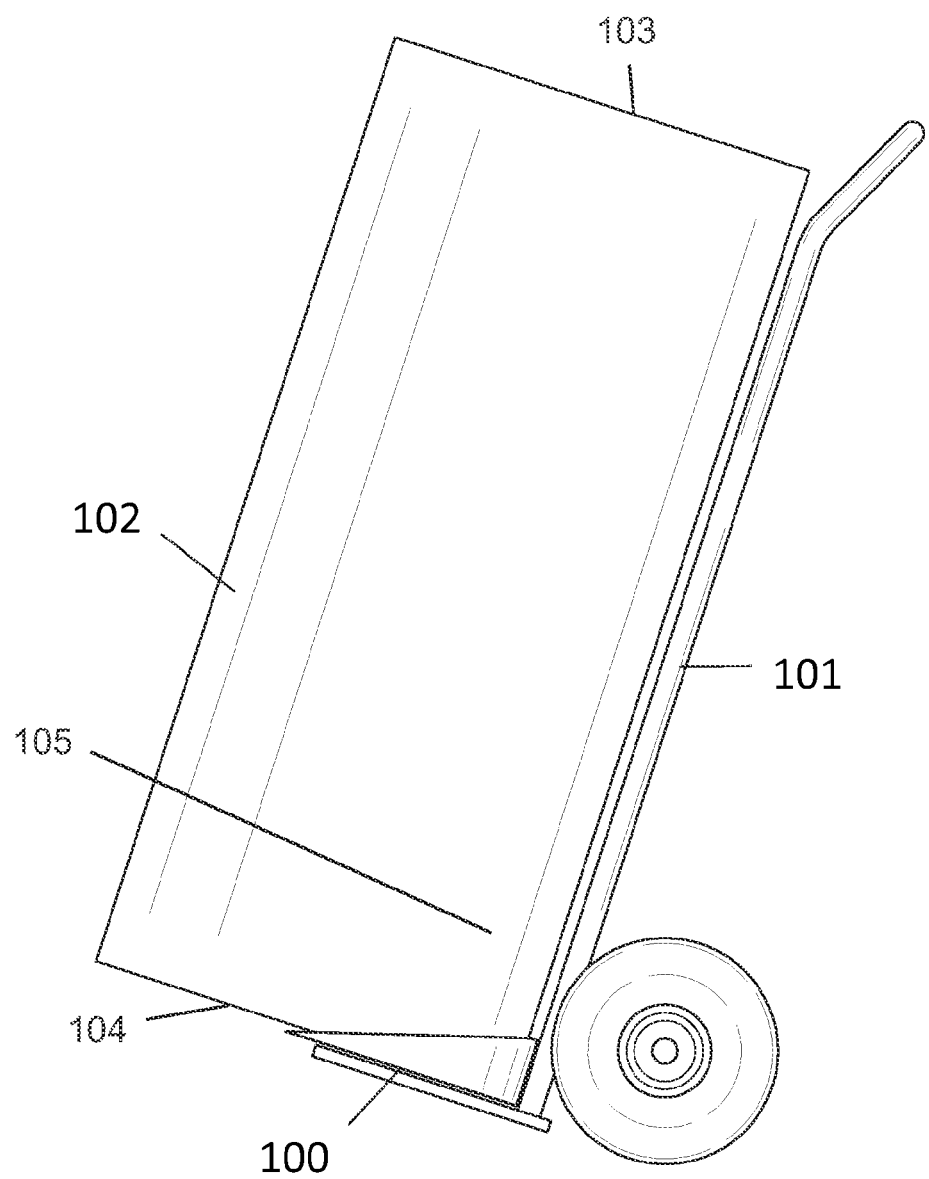
FIG. 5 is an in-use view of the drip pan device of the present invention.

Referring now to FIG. 1-5, the present invention features a novel drip pan device 100 for helping to collect leaks when removing a water heater 102. The drip pan device 100 is typically used when the water heater 102 is being removed with a hand truck 101 (e.g., dolly), as shown in FIG. 5. For example, the drip pan device 100 is placed on the bottom portion of the hand truck 101, and the water heater 102 is placed atop the drip pan device 100. The drip pan device 100 is constructed from a lightweight yet durable material.

Figure 1:
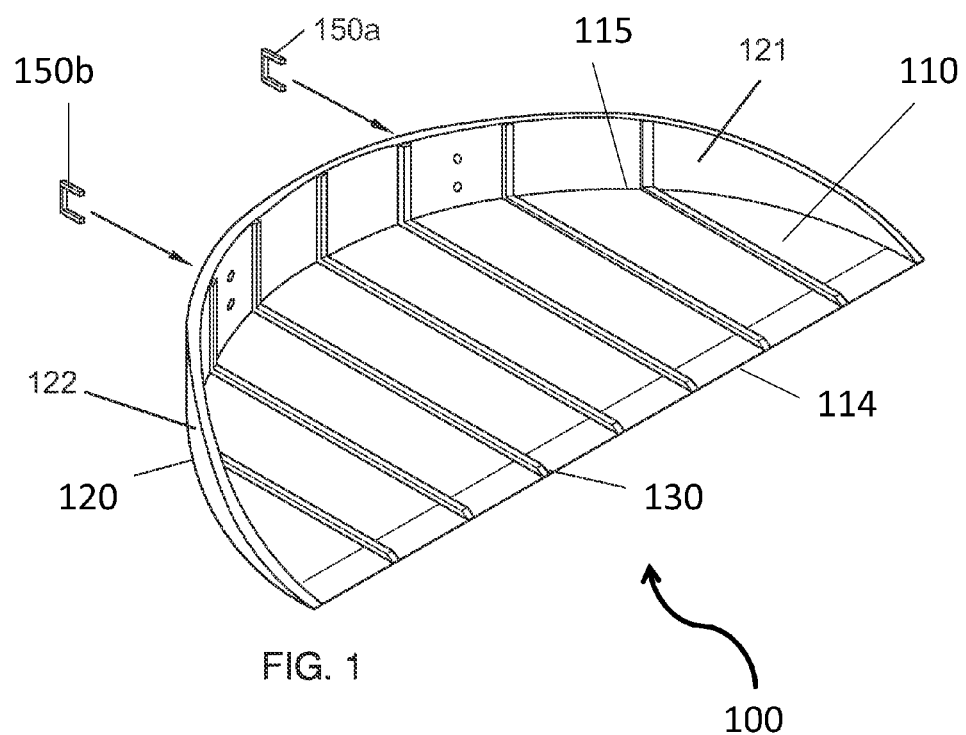
FIG. 1 is a perspective view of the drip pan device of the present invention.

The drip pan device 100 comprises a base platform 110, which may be constructed in a generally semi-circular shape. However, the base platform 110 is not limited to this shape and may be constructed in a different shape, for example rectangular, oval, triangular, etc. The base platform 110 has a back edge 115 and a front edge 114. The back edge 115 may encompass the sides of the base platform 110. For example, as shown in FIG. 1, the back edge 115 is curved and runs from a first side, along the back, and to a second side of the base platform 110. The front edge 114 is beveled allowing for easy sliding of the water heater 102 onto the drip pan device 100.

Extending upwardly from the back edge 115 is a lip 120. The lip 120 is generally perpendicular to the base platform 120. The lip 120 shown in FIG. 1 is curved to fit along the curved back edge 115. The lip 120 tapers down at the intersections (the two intersections) of the back edge 115 and the front edge 114. FIG. 4 shows the sloping of the lip 120 and the tapered intersections of the back edge 115 and front edge 114.

A plurality of raised ribs 130 are disposed and extend upwardly from the top surface of the base platform 110 to a front surface 121 of the lip (120) (see FIG. 1). The ribs 130 can help prevent rusty water from spilling out as the water heater slides back into the drip pan device 100 when the hand truck 101 is tilted backwardly.

Figure 2:
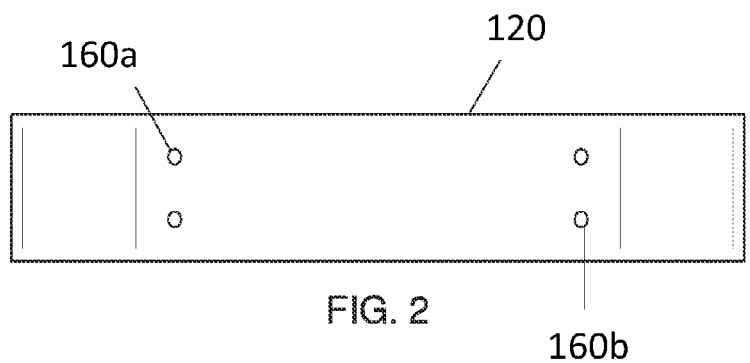
FIG. 2 is a back view of the drip pan device of FIG. 1.
Figure 3:
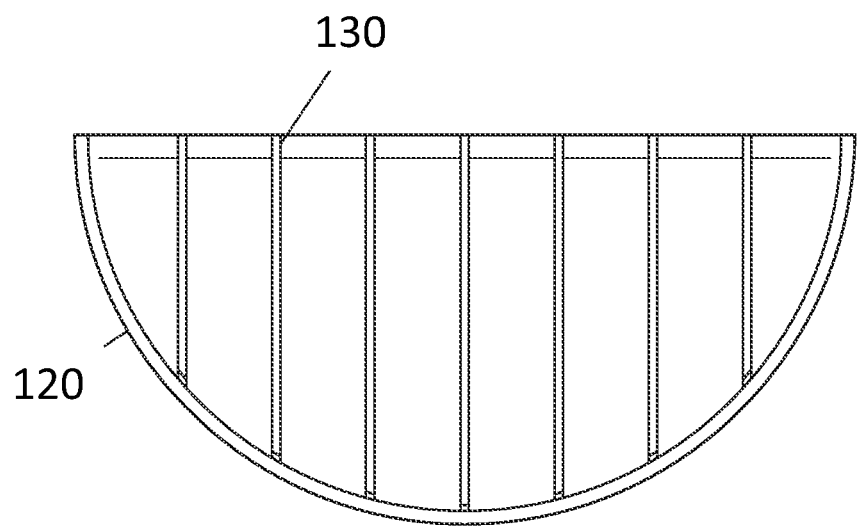
FIG. 3 is a top view of the drip pan device of FIG. 1.

As shown in FIG. 1 and FIG. 2, a first buckle 150a and a second buckle 150b are both removably attached to the back surface 122 of the lip 120. In some embodiments, the first buckle 150a engages a set of first holes 160a disposed in the lip 120 and the second buckle 150b engages a set of second holes 160b disposed in the lip 120. The buckles 150 allow hook-and-loop fasteners, bungee cords, string or rope, or other materials to secure the drip pan device 100 to the hand truck 101 (and/or securing the water heater 102 to the hand truck 101 and/or device 100).

The disclosures of the following U.S. Patents are incorporated in their entirety by reference herein: U.S. Pat. No. 312,016; U.S. Pat. No. 2,921,798; U.S. Design Pat. No. D246,774; U.S. Pat. No. 5,143,389; U.S. Pat. No. 5,299,826; U.S. Pat. No. 6,874,799; U.S. Pat. No. 7,195,257; U.S. Pat. No. 7,431,314; U.S. Pat. Application No. 2007/0114739.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:
1. A drip pan device (100) for helping to collect leaks when removing a water heater, the device comprising:
(a) abuse platform (110) having a front edge (114) and a curved back edge (115), the front edge (114) is bevelled;

(b) a lip (120) extending upwardly and generally perpendicularly from the back edge (115) of the base platform (110), the lip (120) tapers down at intersections of the back edge (115) and front edge (114) of the base platform (110);
(c) a plurality of raised ribs (130) disposed and extending upwardly from a top surface of the base platform (110) to a front surface (121) of the lip (120);
(d) a first buckle (150*a*) and a second buckle (150*b*) disposed on a back surface of the lip (120), the buckles (150) allow hook-and-loop fasteners, bungee cords, string, or rope, to secure the drip pan device (100) to a hand truck (101), wherein the first buckle (150*a*) engages a set of first holes (160*a*) disposed in the lip (120) and the second buckle (150*b*) engages a set of second holes (160*b*) disposed in the lip (120);
wherein the base platform (110) is configured to support a cylindrical water heater (102) having a top surface (103) and bottom surface (104) wherein the cylindrical water heater (102) has a side wall (105) closely contacting the lip (120) when the water heater is being removed.

2. The drip pan device of claim 1, wherein the base platform is generally semi-circular in shape.

3. The drip pan device of claim 1, wherein the first buckle (150*a*) and the second buckle (150*b*) are both removably attached to the back surface (122) of the lip (120).

\* \* \* \* \*